US012747942B2

(12) United States Patent
Oh

(10) Patent No.: US 12,747,942 B2
(45) Date of Patent: Sep. 29, 2026

(54) EPOXY MOLDING COMPOUND THICKNESS MEASUREMENT METHOD AND MEASUREMENT DEVICE

(71) Applicant: ACTRO CO., LTD, Yongin-si (KR)

(72) Inventor: Seong Hoon Oh, Yongin-si (KR)

(73) Assignee: ACTRO CO., LTD, Yongin-si (KR)

( * ) Notice: Subject to any disclaimer, the term of this patent is extended or adjusted under 35 U.S.C. 154(b) by 165 days.

(21) Appl. No.: 18/800,148

(22) Filed: Aug. 12, 2024

(65) Prior Publication Data

US 2025/0060212 A1 Feb. 20, 2025

(30) Foreign Application Priority Data

Aug. 18, 2023 (KR) ........................ 10-2023-0108152

(51) Int. Cl.
*G01B 11/06* (2006.01)

(52) U.S. Cl.
CPC .................................... *G01B 11/06* (2013.01)

(58) Field of Classification Search
CPC ...................................................... G01B 11/06
See application file for complete search history.

(56) References Cited

U.S. PATENT DOCUMENTS 10,872,792 B2 * 12/2020 Kim .................... G01N 21/3581
2005/0098728 A1 * 5/2005 Alfano ............... G01N 21/3581 250/341.8
2019/0080943 A1 * 3/2019 Kim .................... G01N 21/3581
2019/0120753 A1 * 4/2019 Prater ..................... G01N 21/59
2020/0116473 A1 * 4/2020 Kim ........................ G01B 11/06

FOREIGN PATENT DOCUMENTS

JP 2014-209094 A 11/2014
KR 10-1739628 B1 5/2017
KR 10-2017-0142240 A 12/2017
KR 10-2021-0103652 A 8/2021

OTHER PUBLICATIONS

Office Action of Korean Patent Application No. 10-2023-0108152 dated Oct. 24, 2025.

* cited by examiner

*Primary Examiner* — Hugh Maupin
(74) *Attorney, Agent, or Firm* — Revolution IP, PLLC

(57) ABSTRACT

An epoxy molding compound thickness measurement method and the measurement device are disclosed, and the epoxy molding compound thickness measurement method and the measurement device capable of measuring in a non-contact manner the thickness of an epoxy molding compound applied on a semiconductor chip during semiconductor packaging only with reflected light are disclosed.

8 Claims, 6 Drawing Sheets

FIG. 6

| Package | Sample (μm) | | | | | |
|---|---|---|---|---|---|---|
| | #1 | | #2 | | #3 | |
| | Theoretical model | Microscope images | theoretical model | microscope images | theoretical model | microscope images |
| A | 268.2 ± 0.05 | 267.3 | 255.8 ± 0.03 | 257.0 | 260.8 ± 0.01 | 260.2 |
| B | 145.1 ± 0.03 | 144.5 | 147.8 ± 0.05 | 147.1 | 150.2 ± 0.04 | 150.9 |

EPOXY MOLDING COMPOUND THICKNESS MEASUREMENT METHOD AND MEASUREMENT DEVICE

CROSS REFERENCE TO RELATED APPLICATIONS

The present application claims priority to Korean Patent Application No. 10-2023-0108152, filed Aug. 18, 2023, the entire contents of which is incorporated herein for all purposes by this reference.

BACKGROUND

1. Technical Field

The present disclosure relates to an epoxy molding compound thickness measurement method and a measurement device. More particularly, the present disclosure relates to an epoxy molding compound thickness measurement method and a measurement device, the epoxy molding compound thickness measurement method being capable of measuring, in non-contact type, the thickness of an epoxy molding compound applied on a semiconductor chip during semiconductor packaging only with reflected light.

2. Description of the Related Art

Recently, a packaging technique has become more important in semiconductor processes. Accordingly, it is necessary to measure the thickness of epoxy molding compound (EMC) used in semiconductor packaging during the inline process. At this point, a technique has emerged to minimize the thickness of the epoxy molding compound by checking whether the measured thickness is uniform or whether warpage occurs.

To minimize the thickness of the epoxy molding compound, thickness measurement is essential. However, there is a substantial error when using a vision camera during the inline process, and X-rays are difficult to use because the X-rays penetrate and affect a chip.

Meanwhile, a refractive index of the epoxy molding compound is changed depending on a type and temperature and pressure conditions in processes. Therefore, to measure the thickness in a non-contact manner, refractive index values should be corrected or refractive index measurement should be performed separately for each process.

Specifically since the epoxy molding compound is applied on the chip, a transmission mode cannot be used because it affects the chip, and it is preferable to measure in a non-contact manner using only a reflection mode.

For the non-contact thickness measurement or test, recently, the technique has been developed to measure using a terahertz wave. The terahertz wave is an electromagnetic wave with a frequency of about 0.1 to 10 THz, which is between infrared and microwaves. The terahertz wave penetrates a non-metallic material well and enables high-resolution imaging. Therefore, the terahertz wave is widely used for non-destructive and non-contact testing of new lightweight materials.

Conventionally, the technique has been developed to inspect silicon wafers by measuring a terahertz wave by reflecting and transmitting the terahertz wave to the silicon wafer. However, the epoxy molding compound applied on the chip in the inline process cannot be used in the transmission mode, so the technique cannot be applied.

DOCUMENTS OF RELATED ART (Patent Document 1) Korean Patent No. 10-1739628 (Invention Title: Apparatus and method for analyzing a semiconductor wafer by using a terahertz wave, Registration Date: May 24, 2017)

SUMMARY

Accordingly, the present disclosure has been made keeping in mind the above problems occurring in the related art, and an objective of the present disclosure is to provide an epoxy molding compound thickness measurement method and a measurement device, and the epoxy molding compound thickness measurement method is capable of emitting a terahertz wave to a semiconductor chip package, measuring intensity a reflected terahertz wave, and measuring a refractive index and thickness of an epoxy molding compound applied on the chip by comparing the reflected wave and a reference terahertz wave.

Objectives of the present disclosure are not limited to the objective mentioned above, and other objectives not mentioned may be clearly understood by those skilled in the art from the description hereinbelow.

To solve the above-mentioned objective, the present disclosure provides an epoxy molding compound thickness measurement method, the epoxy molding compound thickness measurement method including: emitting a terahertz wave to a sample; emitting the terahertz wave to a mirror; measuring a sample-reflected wave intensity, which is performed by measuring an intensity of a sample-reflected wave reflected in the emitting to a sample; measuring a mirror-reflected wave intensity, which is performed by measuring an intensity of a mirror-reflected wave reflected in the emitting to a mirror; calculating a calculation sample-reflected wave intensity, which is performed by calculating a calculation sample-reflected wave intensity from the mirror-reflected wave intensity and a sample-reflected wave intensity transfer function; repeating the calculating of a calculation sample-reflected wave intensity, which is performed by repeating the calculating of a calculation sample-reflected wave intensity by changing a thickness and a complex refractive index of the sample until a difference between the sample-reflected wave intensity and the calculation sample-reflected wave intensity is less than or equal to a specific value; and determining a sample complex refractive index, which is performed by determining a complex refractive index when a difference between the sample-reflected wave intensity and the calculation sample-reflected wave intensity is initially less than or equal to the specific value in the repeating, as a complex refractive index of the sample.

Furthermore, the present disclosure provides epoxy molding compound thickness measurement method, the epoxy molding compound thickness measurement method including: emitting a terahertz wave to a sample; emitting the terahertz wave to a mirror; measuring a sample-reflected wave intensity, which is performed by measuring an intensity of a sample-reflected wave reflected in the emitting to a sample; measuring a mirror-reflected wave intensity, which is performed by measuring an intensity of a mirror-reflected wave reflected in the emitting to a mirror; calculating an intensity rate, which is performed by calculating a rate of the sample-reflected wave intensity and the mirror-reflected wave intensity; repeating the calculating of a sample-reflected wave intensity, which is performed by repeatedly calculating a sample-reflected wave intensity transfer function value by changing a thickness and a complex refractive index of the sample until a difference between the intensity rate and the sample-reflected wave intensity transfer function value is less than or equal to a specific value; and determining a sample complex refractive index, which is performed by determining a complex refractive index when a difference between the intensity rate and the sample-reflected wave intensity transfer function value is initially less than or equal to the specific value in the repeating of the calculating of a sample-reflected wave intensity, as a complex refractive index of the sample.

Furthermore, in the emitting to the sample and the emitting to the mirror, a mirror focal plane and a sample focal plane where focal planes of the terahertz wave emitted to the mirror and the sample may be the same.

Furthermore, in the emitting to the sample and the emitting to the mirror, a mirror focal plane and a sample focal plane that are focal planes of the terahertz wave emitted to the mirror and the sample may adjust a height of the mirror or a height of the sample such that a peak value of a mirror-reflected wave and a peak value of a sample-reflected wave are measured at the same time.

Furthermore, the sample-reflected wave intensity transfer function may be a function of a reflection coefficient of the mirror, a sample-chip reflection coefficient, a sample-chip transmission coefficient, an air-sample reflection coefficient, an air-sample transmission coefficient, a light velocity, a thickness of the sample, and a complex refractive index of the sample.

Furthermore, the present disclosure provides an epoxy molding compound thickness measurement device, the epoxy molding compound thickness measurement device including a terahertz wave emission unit emitting a terahertz wave; a terahertz wave receiver receiving a sample-reflected wave and a mirror-reflected wave that are the terahertz wave reflected from a sample and a mirror; a sample holder holding the sample; a mirror holder holding the mirror; and a control unit calculating a thickness of the sample by using the sample-reflected wave and the mirror-reflected wave.

The epoxy molding compound thickness measurement method and the measurement device according to the present disclosure have the following effects.

First, according to the present disclosure, since the epoxy molding compound thickness measurement method uses only the reflection mode, not the transmission mode, the semiconductor chip is not affected, and the measurement is possible only at the upper part, so the device can be simplified.

Second, the refractive index and the thickness of the epoxy molding compound can be measured with a calculation in which the terahertz wave is emitted and only intensity of the reflected terahertz wave is measured, so measurement is quickly performed, and a relatively precise value can be obtained.

Third, the retractive index and the thickness of the epoxy molding compound can be measured from the semiconductor packaging quickly and precisely, so the thickness of the epoxy molding compound can be reduced in manufacturing, and the method and the device can be used to inspect a large area panel level packaging or a wafer level packaging in future.

Effects of the present disclosure are not limited to the effects mentioned above, and other effects not mentioned may be clearly understood by those skilled in the art from the accompanying claims.

BRIEF DESCRIPTION OF THE DRAWINGS

FIG. 6 is a view illustrating comparison of a refractive index measured by the epoxy molding compound thickness measurement method according to the first embodiment of the present disclosure and an actual refractive index.

DETAILED DESCRIPTION

Figure 1:
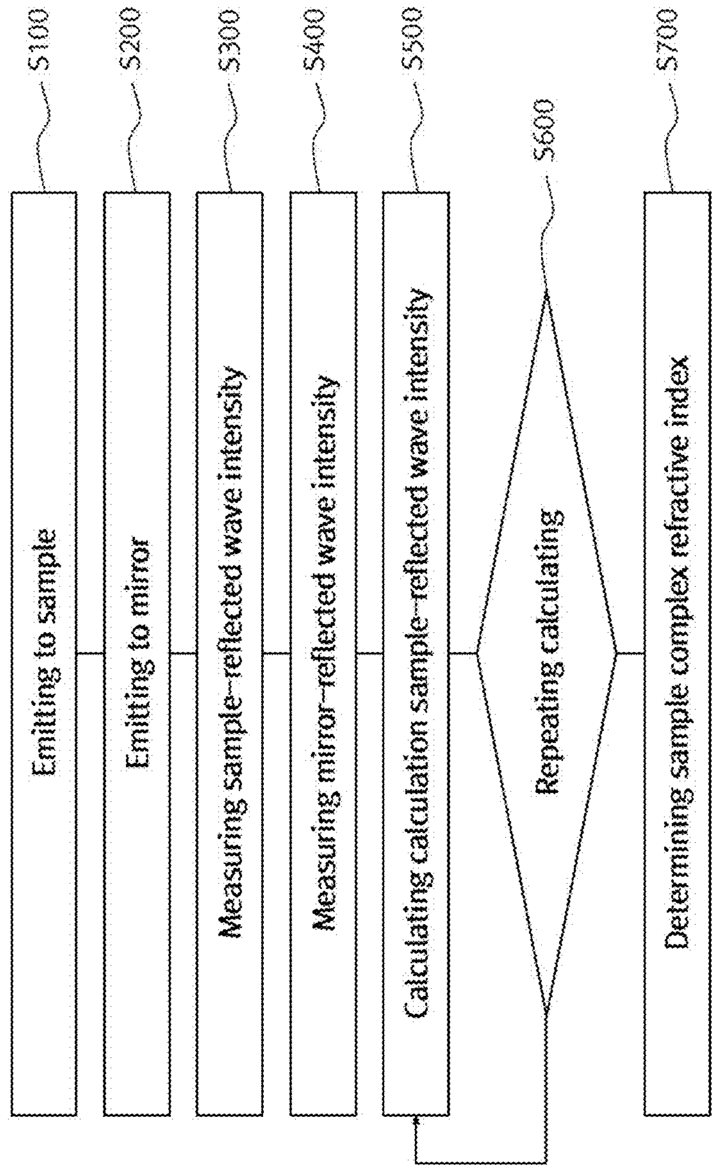
FIG. 1 is a flowchart of an epoxy molding compound thickness measurement method according to a first embodiment of the present disclosure.

The above and other objects, features and advantages of embodiments of the present disclosure, and a method of achieving them will be more clearly understood with reference to the embodiments described below in detail in conjunction with the accompanying drawings. However, the present disclosure is not limited to the following embodiments, and can be embodied in various forms different from each other, and embodiments of the present disclosure are presented to make complete disclosure of the present disclosure and help those who are ordinarily skilled in the art to which the present disclosure belongs understand the present disclosure. The present disclosure is only defined by the scope of the claims. The same reference numerals are used throughout the specification to designate the same or similar parts.

It should be understood that the shape and size of the elements shown in the drawings may be exaggeratedly drawn to provide an easily understood description of the structure of the present disclosure. Wherever possible, the same reference numerals will be used throughout the drawings and the description to refer to the same or like elements or parts. Furthermore, when the functions of conventional parts and the detailed description of parts related with the present disclosure may make the gist of the present disclosure unclear, a detailed description of those parts will be omitted.

Terms used in this specification are selected to describe embodiments' and thus should not be construed as the limit of the present disclosure. An element expressed in a singular form in this specification may be plural elements unless it is necessarily singular in the context. The terms "comprise" and/or "comprising" means inclusion of a shape, number, process, operations, member, element, and/or a group of those, but do not mean exclusion of or denial of addition of another shape, number, process, operation, element, and/or a group of those.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, the terms used herein to describe a relationship between elements should be interpreted in the same manner as those described above.

The terms top, bottom, upper surface, lower surface, upper part, lower part, etc. used in this specification are used to distinguish the relative positions of parts. For example, if the upper part in the drawing is conveniently referred to as the upper part and the lower part in the drawing is referred to as the lower part, in practice, the upper part may be referred to as the lower part and the lower part may be referred to as the upper part without departing from the scope of the present disclosure.

It will be understood that, although the terms first, second, etc. may be used herein to describe various elements, these elements should not be limited by these terms. These terms are only used to distinguish one element from another. The terms are used only for the purpose for distinguishing a constitutive element from other constitutive element, but constitutive element should not be limited to a manufacturing order, and the terms described in the detailed description of the present disclosure may not be consistent with those described in the claims.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art and will not be interpreted in an idealized or overly formal sense unless expressly so defined herein.

Hereinbelow, an epoxy molding compound thickness measurement method and a measurement device according to a first embodiment and a second embodiment of the present disclosure will be described with reference to accompanying drawings.

Figure 2:
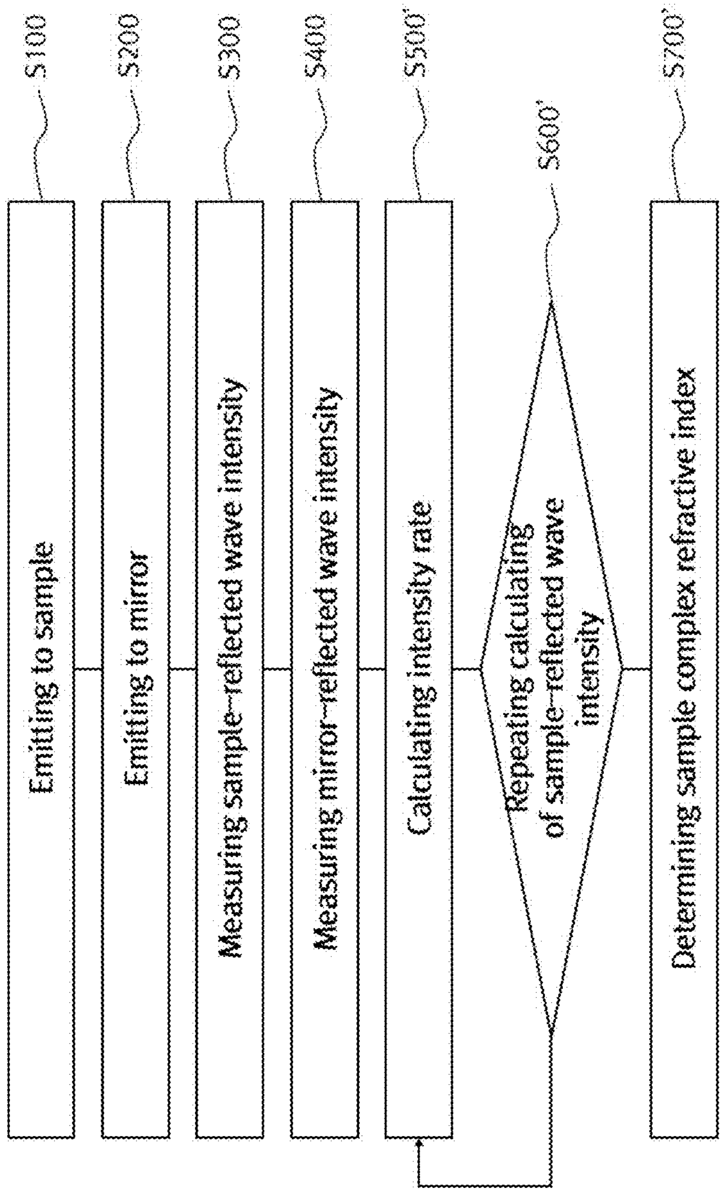
FIG. 2 is a flowchart of an epoxy molding compound thickness measurement method according to a second embodiment of the present disclosure.
Figure 3:
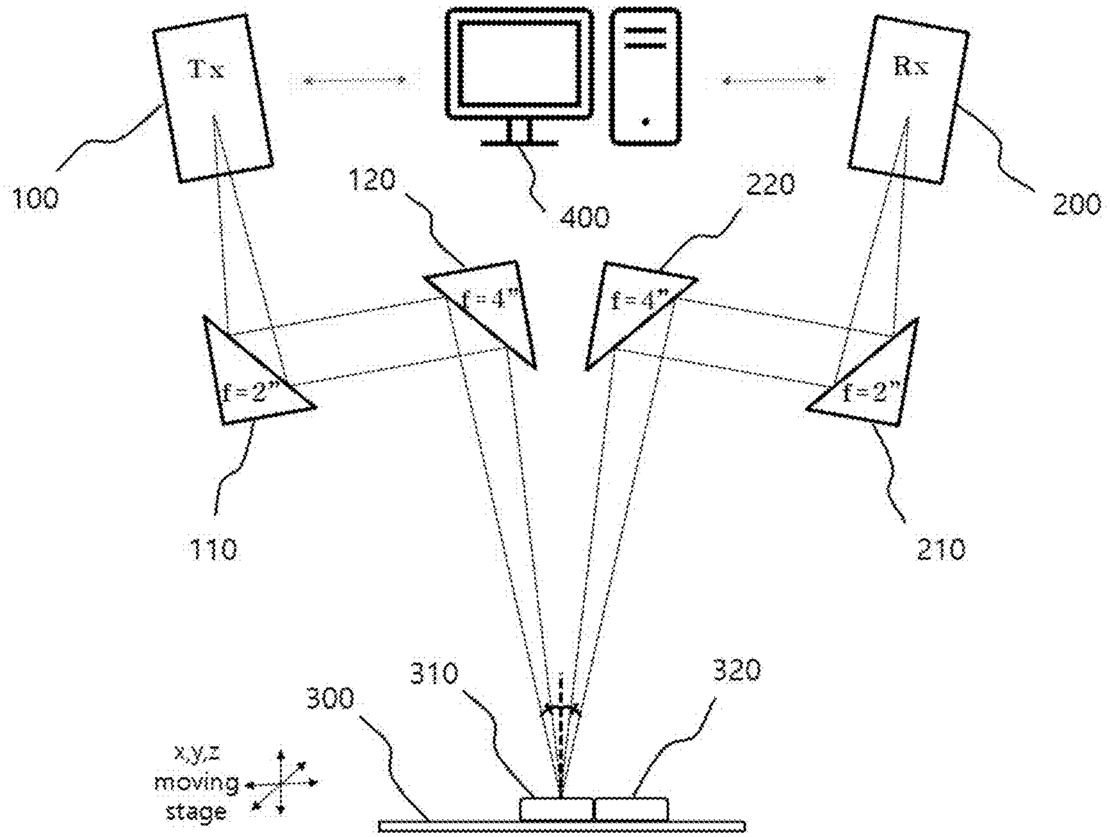
FIG. 3 is a view illustrating configuration of an epoxy molding compound thickness measurement device according to the present disclosure.
Figure 4:
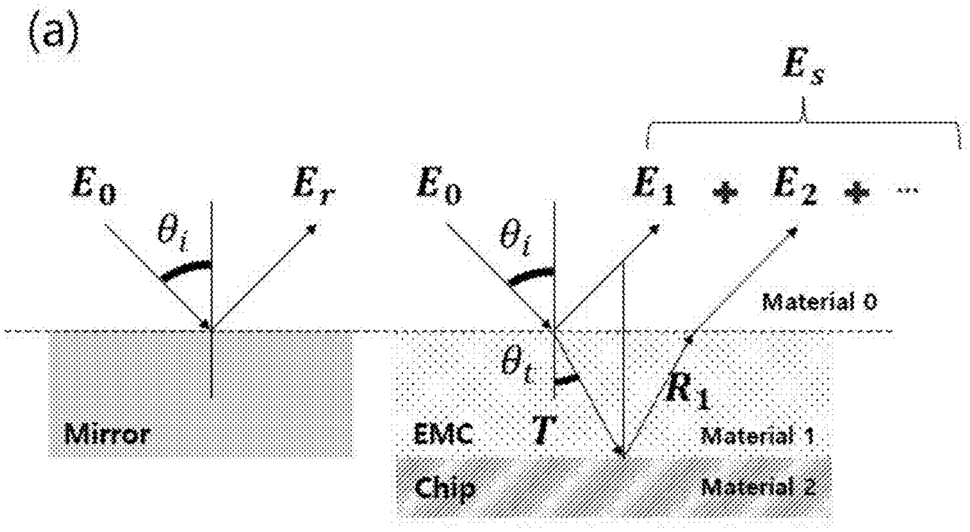
FIG. 4 is a view schematically illustrating a reflection mode of the epoxy molding compound thickness measurement method according to the present disclosure.
Figure 4:
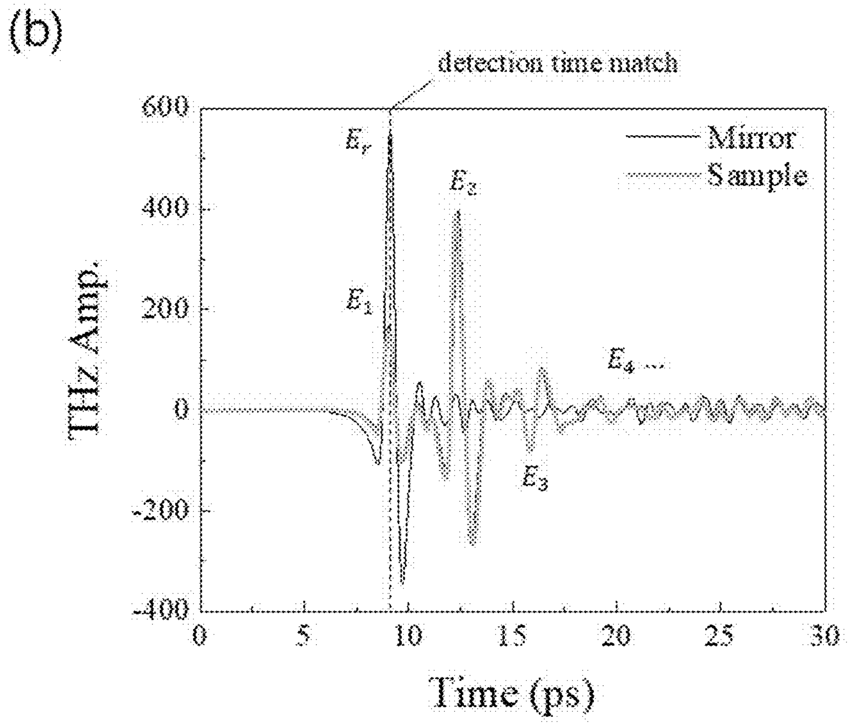
Figure 5:
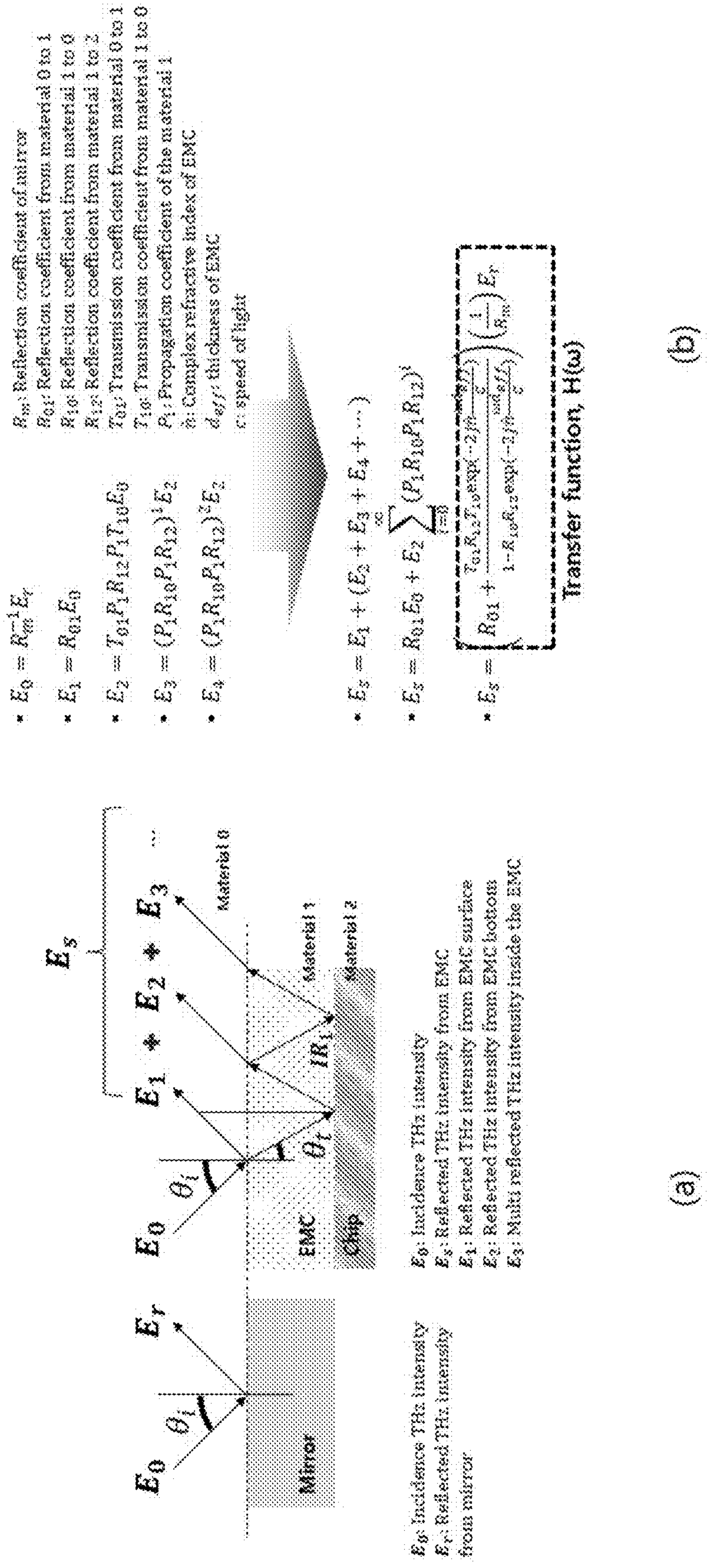
FIG. 5 is a view schematically illustrating a sample-reflected wave intensity transfer function of the epoxy molding compound thickness measurement method according to the present disclosure.

FIG. 1 is a flowchart of an epoxy molding compound thickness measurement method according to a first embodiment of the present disclosure. FIG. 2 is a flowchart of an epoxy molding compound thickness measurement method according to a second embodiment of the present disclosure. FIG. 3 is a view illustrating configuration of an epoxy molding compound thickness measurement device according to the present disclosure. FIG. 4 is a view schematically illustrating a reflection mode of the epoxy molding compound thickness measurement method according to the present disclosure. FIG. 5 is a view schematically illustrating a sample-reflected wave intensity transfer function of the epoxy molding compound thickness measurement method according to the present disclosure. FIG. 6 is a view illustrating comparison of a refractive index measured by the epoxy molding compound thickness measurement method according to the first embodiment of the present disclosure and an actual refractive index.

Referring to FIG. 1, according to the first embodiment of the present disclosure, the epoxy molding compound thickness measurement method may include: emitting a terahertz wave to a sample, S100; emitting the terahertz wave to a mirror, S200; measuring a sample-reflected wave intensity, S300, which is performed by measuring intensity of the sample-reflected wave reflected in the emitting to the sample at S100; measuring a mirror-reflected wave intensity, S400, which is performed by measuring intensity of the mirror-reflected wave reflected in the emitting to the mirror S200; calculating a calculation sample-reflected wave intensity, S500, which is performed by calculating a calculation sample-reflected wave intensity from the mirror-reflected wave intensity and a sample-reflected wave intensity transfer function repeating the calculating, S600, which is performed by repeating the calculating of a calculation sample-reflected wave intensity at S500 by changing a thickness and a complex refractive index of the sample until a difference between the sample-reflected wave intensity and the calculation sample-reflected wave intensity is less than or equal to a specific value; and determining a sample complex refractive index, S700, which is performed by determining a complex refractive index when a difference between the sample-reflected wave intensity and the calculation sample-reflected wave intensity is initially less than or equal to the specific value in the repeating at S600, as a complex refractive index of the sample.

The emitting to the sample at S100 is performed by emitting a terahertz wave to a sample. The sample is an epoxy molding compound applied on a semiconductor chip as illustrated in FIG. 4, and the terahertz-wave is emitted to a surface of the sample.

Likewise, the emitting to the mirror at S200 is performed by emitting the terahertz wave to a mirror. A mirror-reflected wave, which will be described, is obtained to find a transfer function.

Each of the measuring of a sample-reflected wave intensity at S300 and the measuring of a mirror-reflected wave intensity at S400 is performed by measuring a reflected terahertz wave from the sample and the mirror, and based on FIG. 4, which will be described as follow.

Referring to FIG. 4, the terahertz wave ($E_0$) is equally emitted to both the sample and the mirror, and each reflected wave is obtained therefrom. In other words, when the terahertz wave emitted to the mirror is reflected, the terahertz wave becomes a mirror-reflected wave ($E_1$), and intensity (amplitude) is measured to this.

Meanwhile, when the equal terahertz wave ($E_0$) is emitted to the sample, a reflected wave becomes a sample-reflected wave ($E_3$). The sample-reflected wave is obtained by combining a reflected wave ($E_1$) from a surface of the epoxy molding compound and a reflected wave ($E_1$) from the chip while passing through the epoxy molding compound. Of course, reflected waves ($E_1$, $E_2$, $E_x$, . . . referring to FIG. 5) that are additionally generated by being continuously reflelted from the epoxy molding compound are simultaneously measured, and the sample-reflected wave may have various peak values (referring to FIG. 4B).

The sample-reflected wave intensity and the mirror-reflected wave intensity measured as described above may be used to find a transfer function. In the calculating of a calculation sample-reflected wave intenssity at S500, a calculation sample-reflected wave intensity may be calculated from the transfer function.

Hereinbelow, a method for calculating a calculation sample-reflected wave intensity will be described. Referring to FIG. 5, the calculation equations of the mirror-reflected wave intensity and the sample-reflected wave intensity may be used to find a sample-reflected wave intensity transfer function ($H_w$).

First, the mirror-reflected wave ($E_2$) is generated when the terahertz wave emitted to the mirror is reflected, and the mirror does not have other reflected waves. Therefore, as in Equation 1, an interaction equation between the terahertz wave ($E_0$) and the mirror-reflected wave ($E_1$ is achieved through a reflection coefficient (Rm) of the mirror.

$$E_0 = R_m^{-1} E_r \quad \text{[Equation 1]}$$

Likewise, the sample-reflected wave ($E_z$) is generated when the terahertz wave ($E_0$) emitted to the sample is reflected. Therefore, the sample-reflected wave ($E_2$) is obtained by combining all reflected waves ($E_1$, $E_2$, $E_3$, . . . ) reflected from each surface (epoxy molding compound surface and chip surface).

In this case, describing the interaction equations, when air is defined as a material 0, the epoxy molding compound is defined as a material 1, and the chip is defined as a material 2, and when a reflection coefficient from the material 0 to the material 1 is defined as $R_{01}$, a following Equation 2 is established.

$$E_1 = R_{01}E_0 \quad \text{[Equation 2]}$$

Likewise, a transmission coefficient from the material 0 to the material 1 is defined as ($T_{01}$), and a propagation coefficient at the material 1 is defined as P1, a second reflected wave ($E_2$) has a following relation equation with the terahertz wave ($E_0$).

$$E_2 = T_{01}P_1R_{12}P_1T_{10}E_0 \quad \text{[Equation 3]}$$

When the equation extends to a reflected wave ($E_3$), a reflected wave ($E_4$), etc., as follows, Equation 4, Equation 5, etc. are obtained, and when the equations are added, total sum equations as indicated in Equation 6 and Equation 7 are established.

$$E_3 = (P_1R_{10}P_1R_{12})^2E_2 \quad \text{[Equation 4]}$$

$$E_4 = (P_1R_{10}P_1R_{12})^2E_2 \quad \text{[Equation 5]}$$

$$E_s = E_1 + (E_2 + E_3 + E_4 + \ldots) \quad \text{[Equation 6]}$$

$$E_s = R_{01}E_0 + E_2\sum_{i=0}^{\infty}(P_1R_{10}P_1R_{12})^i \quad \text{[Equation 7]}$$

This is expressed as a complex number relation equation to form a relation equation of Equation 8, and a relation equation between the sample-reflected wave ($E_s$) and the mirror-reflected wave ($E_r$) is established, and the sample-reflected wave intensity transfer function (H(ω)) is determined as Equation 9 therebetween.

$$E_s = \left(R_{01} + \frac{T_{01}R_{12}T_{10}\exp\left(-2j\tilde{n}\frac{\omega d_{eff}}{c}\right)}{1 - R_{10}R_{12}\exp\left(-2j\tilde{n}\frac{\omega d_{eff}}{c}\right)}\right)\left(\frac{1}{R_m}\right)E_r \quad \text{[Equation 8]}$$

$$H(\omega) = \left(R_{01} + \frac{T_{01}R_{12}T_{10}\exp\left(-2j\tilde{n}\frac{\omega d_{eff}}{c}\right)}{1 - R_{10}R_{12}\exp\left(-2j\tilde{n}\frac{\omega d_{eff}}{c}\right)}\right)\left(\frac{1}{R_m}\right) \quad \text{[Equation 9]}$$

The sample-reflected wave intensity transfer function (H(ω)) is a function of a reflection coefficient of the mirror, a sample-chip reflection coefficient, a sample-chip transmission coefficient, an air-sample reflection coefficient, an air-sample transmission coefficient, a light velocity, a thickness of the sample, and a complex Refractive Index of the sample.

The calculation sample-reflected wave intensity is calculated as follows.

The calculation sample-reflected wave ($E_s'$) is indicated with multiplication of the sample-reflected wave intensity transfer function (H(ω)) and the mirror-reflected wave ($E_r$), and the mirror-reflected wave ($E_r$) is measured, so the intensity value is known.

As described above, the sample-reflected wave intensity transfer function (H(ω)) is a function of a reflection coefficient of the mirror, a sample-chip reflection coefficient, a sample-chip transmission coefficient, an air-sample reflection coefficient, an air-sample transmission coefficient, a light velocity, a thickness of the sample, and a complex refractive index of the sample, and variables are the thickness of the sample and the complex refractive index of the sample, and the remains are constants.

Therefore, initial values of the thickness of the sample and the complex refractive index of the sample are preset, and then iteration (repeated calculation) is performed by changing values constant and sweeping. Therefore, a value of the sample-reflected wave intensity transfer function (H(ω)) may be calculated for the thickness and the complex refractive index of each sample.

As described above, when a value of the sample-reflected wave intensity transfer function is calculated, the calculation sample-reflected wave ($E_s'$) may be calculated by multiplying the value and the mirror-reflec ed wave ($E_r$).

In the repeating at S600, until a difference between the intensity of the sample-reflected wave ($E_s$) and the intensity of the calculation sample-reflected wave ($E_s'$) is less than or equal to the specific value, a calculation is repeated while changing the thickness and the complex refractive index of the sample.

In the determining of a sample complex refractive index at S700, a complex refractive index when a difference between the sample-reflected wave intensity and calculation sample-reflected wave intensity is initially less than or equal to the specific value in the repeating at S600 is determined as a complex refractive index of the sample, and the thickness of the sample at this time may be determined.

The thickness: of the sample should be calculated with the value input in the repeating at S600, but a complex refractive index is calculated first, and then, for example, the thickness of the sample may be calculated from Equation 10.

$$d = \frac{c}{2n_{EMC}} \times \Delta t\cos\left[\sin^{-1}\left(\frac{\sin 8°}{n_{EMC}}\right)\right] \quad \text{[Equation 10]}$$

Herein, Δt is a time between peak values obtained by the sample-reflected wave intensity and is a time between a first peak to a second peak.

Referring to FIG. 2, according to a second embodiment of the present disclosure, the epoxy molding compound thickness measurement method may include: emitting a terahertz wave to a sample, S100; emitting the terahertz wave to a mirror, S200; measuring a sample-reflected wave intensity, S300, which is performed by measuring a sample-reflected wave intensity reflected in the emitting to the sample at S100; measuring a mirror-reflected wave intensity, S400, which is performed by measuring a mirror-reflected wave intensity reflected in the emitting to the mirror at S200; calculating an intensity rate, S500', which is performed by calculating an intensity rate between the measured sample-reflected wave intensity and the measured mirror-reflected wave intensity; repeating the calculating of a sample-reflected wave intensity, S600', which is performed by repeating the calculation of a sample-reflected wave intensity transfer function value by changing a thickness and a complex refractive index of the sample until a difference between the intensity rate and the sample-reflected wave intensity transfer function value is less than or equal to a specific value; and determining a sample complex refractive index, S700', which is performed by determining a complex refractive: index when a difference between the intensity rate and the sample-reflected wave intensity transfer function value is initially less or equal to the specific value in the repeating of the calculation of the sample-reflected wave intensity at S600', as the complex refractive index of the sample.

According to the second embodiment, the mirror-reflected wave intensity and the sample-reflected wave intensity are measured equal to the first embodiment. However, in the calculating of an intensity rate at S500', the rate of the measured sample-reflected wave intensity and the measured mirror-reflected wave intensity is calculated. In other words, since the above-calculated value is a value of the sample-reflected wave intensity transfer function ($H(\omega)$), by comparing the calculated intensity rate and the calculation sample-reflected wave intensity transfer function value repeatedly calculated by sweeping the thickness and the complex refractive index of the sample, the thickness or the complex refractive index of the sample when a difference therebetween is less than or equal to the specific value is a final desired value.

In other words, the repeating of the calculation of the sample-reflected wave intensity at S600', until the difference between the intensity rate and the sample-reflected wave intensity transfer function value is less than or equal to the specific value, the sample-reflected wave intensity transfer function value is repeatedly calculated by changing the thickness and the complex refractive index of the sample. In the determining of the sample complex refractive index at S700', the complex refractive index of the sample is determined as the complex refractive index when the difference between the intensity rate and the sample-reflected wave intensity transfer function value is initially less than or equal to the specific value in the repeating of the calculation of a sample-reflected wave intensity at S600'.

Meanwhile, in the emitting to the sample at S100 and the emitting to the mirror S200, a mirror focal plane and a sample focal plane that are focal planes of the terahertz wave emitted to the mirror and the sample (EMC) may be the same.

In other words, since the terahertz wave ($E_0$) should be equally incident, there is no error in measurement. Therefore, the sample and the mirror should be set at the same height to have the same focal plane.

Therefore, at the emitting to the sample at S100 and the emitting to the mirror at S200, the mirror focal plane and the sample (EMC) focal plane that are the focal plane of the terahertz wave emitted to the mirror and the sample (EMC) may adjust the height of the mirror or the sample (EMC) so as to measure peak values of the mirror-reflected wave and the sample-reflected wave at the same time.

In other words, as the terahertz wave ($E_0$) with the same intensity should be emitted to the focal planes at the same height, the reflected waves may be reflected at the same time, and intensity may be measured without an error. Therefore, as the heights of the mirror and the sample should be adjusted, the focal planes may match with each other.

Referring to FIG. 3, according to the present disclosure, the epoxy molding compound thickness measurement device may include: a terahertz wave emission unit 100 emitting a terahertz wave ($E_0$); a terahertz wave receiver 200 receiving a sample-reflected wave and a mirror-reflected wave that are the terahertz waves reflected from a sample (EMC) and a mirror; a sample holding unit 300 holding the sample (EMC) and the mirror; and a control unit 400 calculating the thickness of the sample (EMC) by using the sample-reflected wave and the mirror-reflected wave.

The terahertz wave emission unit 100 may generate and emit a terahertz wave ($E_0$), and may include a first collimating mirror 110 and a first focusing mirror 120.

The first collimating mirror 110 may allow the generated terahertz wave ($E_0$) to pass through the first collimating mirror 110 and be parallel. The first collimating mirror 110 may be replaced by a parabolic reflector, which has the same function.

The first focusing mirror 120 may focus the terahertz wave ($E_0$) passing through the first collimating mirror 110 and proceeding in parallel, on the sample.

The terahertz wave receiver 200 may receive the terahertz wave reflected from the mirror and the sample and calculate the thickness and the complex refractive index of the sample based on the reflected wave.

The terahertz wave receiver 200 may include a second collimating mirror 210 and a second focusing mirror 220.

The second collimating mirror 210 may serve to collect the reflected terahertz wave to be received by the terahertz wave receiver 200.

The second focusing mirror 220 may allow the terahertz wave reflected and returned from the sample to proceed in parallel.

The sample holding unit 300 may hold the sample and the mirror where the terahertz wave ($E_0$) emitted from the terahertz wave emission unit 100 is emitted. Accordingly, the sample holding unit 300 may include a sample holder 310 and a mirror holder 320.

The sample holder 310 and the mirror holder 320 may set the heights of the mirror and the sample such that the focal planes thereof are the same.

The control unit 500 may control the terahertz wave emission unit 100. The control unit 500 may calculate the refractive index and the thickness of the sample based on information transmitted from the terahertz wave receiver 200 and may adjust the height of the sample holder and the height of the mirror holder.

Detailed contents are the same as the method described above, so the description will be omitted herein.

Although the preferred embodiments of the present invention have been disclosed in detail with reference to the accompanying drawings, and the present disclosure is not limited to the specific embodiment described above. The present disclosure is not limited to the embodiments and those skilled in the art will appreciate that various modifications, additions, and substitutions are possible, without departing from the spirit and scope of the present disclosure, and the modifications should not be understood individually from the technical ideas of the present disclosure.

The invention claimed is:

1. An epoxy molding compound thickness measurement method comprising:

emitting a terahertz wave to a sample;

emitting the terahertz wave to a mirror;

measuring a sample-reflected wave intensity, which is performed by measuring an intensity of a sample-reflected wave reflected in the emitting to a sample;

measuring a mirror-reflected wave intensity, which is performed by measuring an intensity of a mirror-reflected wave reflected in the emitting to a mirror;

calculating a calculation sample-reflected wave intensity, which is performed by calculating a calculation sample-reflected wave intensity from the mirror-reflected wave intensity and a sample-reflected wave intensity transfer function;

repeating the calculating of a calculation sample-reflected wave intensity, which is performed by repeating the calculating of a calculation sample-reflected wave intensity by changing a thickness and a complex refractive index of the sample until a difference between the sample-reflected wave intensity and the calculation sample-reflected wave intensity is less than or equal to a specific value; and determining a sample complex refractive index, which is performed by determining a complex refractive index when a difference between the sample-reflected wave intensity and the calculation sample-reflected wave intensity is initially less than or equal to the specific value in the repeating, as a complex refractive index of the sample.

2. An epoxy molding compound thickness measurement method comprising:

emitting a terahertz wave to a sample;

emitting the terahertz wave to a mirror;

measuring a sample-reflected wave intensity, which is performed by measuring intensity of a sample-reflected wave reflected in the emitting to a sample;

measuring a mirror-reflected wave intensity, which is performed by measuring intensity of a mirror-reflected wave reflected in the emitting to a mirror;

calculating an intensity rate, which is performed by calculating a rate of the sample-reflected wave intensity and the mirror-reflected wave intensity;

repeating the calculating of a sample-reflected wave intensity, which is performed by repeatedly calculating a sample-reflected wave intensity transfer function value by changing a thickness and a complex refractive index of the sample until a difference between the intensity rate and the sample-reflected wave intensity transfer function value is less than or equal to a specific value; and determining a sample complex refractive index, which is performed by determining a complex refractive index when a difference between the intensity rate and the sample-reflected wave intensity transfer function value is initially less than or equal to the specific value in the repeating of the calculating of a sample-reflected wave intensity, as a complex refractive index of the sample.

3. The epoxy molding compound thickness measurement method of claim 1, wherein, in the emitting to the sample and the emitting to the mirror, a mirror focal plane and a sample focal plane where focal planes of the terahertz wave emitted to the mirror and the sample are the same.

4. The epoxy molding compound thickness measurement method of claim 1, wherein, in the emitting to the sample and the emitting to the mirror, a mirror focal plane and a sample focal plane that are focal planes of the terahertz wave emitted to the mirror and the sample adjust a height of the mirror or a height of the sample such that a peak value of a mirror-reflected wave and a peak value of a sample-reflected wave are measured at the same time.

5. The epoxy molding compound thickness measurement method of claim 1, wherein the sample-reflected wave intensity transfer function is a function of a reflection coefficient of the mirror, a sample-chip reflection coefficient, a sample-chip transmission coefficient, an air-sample reflection coefficient, an air-sample transmission coefficient, a light velocity, a thickness of the sample, and a complex refractive index of the sample.

6. The epoxy molding compound thickness measurement method of claim 2, wherein, in the emitting to the sample and the emitting to the mirror, a mirror focal plane and a sample focal plane where focal planes of the terahertz wave emitted to the mirror and the sample are the same.

7. The epoxy molding compound thickness measurement method of claim 2, wherein, in the emitting to the sample and the emitting to the mirror, a mirror focal plane and a sample focal plane that are focal planes of the terahertz wave emitted to the mirror and the sample adjust a height of the mirror or a height of the sample such that a peak value of a mirror-reflected wave and a peak value of a sample-reflected wave are measured at the same time.

8. The epoxy molding compound thickness measurement method of claim 2, wherein the sample-reflected wave intensity transfer function is a function of a reflection coefficient of the mirror, a sample-chip reflection coefficient, a sample-chip transmission coefficient, an air-sample reflection coefficient, an air-sample transmission coefficient, a light velocity, a thickness of the sample, and a complex refractive index of the sample.

* * * * *